July 28, 1931.  H. SHAW  1,816,443

PIPE FASTENER

Filed Sept. 19, 1928

WITNESS:
Robt P Kitchel

INVENTOR
Herbert Shaw
BY
Busser & Harding
ATTORNEYS.

Patented July 28, 1931

1,816,443

UNITED STATES PATENT OFFICE

HERBERT SHAW, OF PHILADELPHIA, PENNSYLVANIA, ASSIGNOR TO BERGER BROS. COMPANY, OF PHILADELPHIA, PENNSYLVANIA, A CORPORATION OF PENNSYLVANIA

PIPE FASTENER

Application filed September 19, 1928. Serial No. 306,914.

This invention relates to a pipe fastener particularly adapted to secure a water pipe or the like to a vertical wall.

It is customary to secure vertical pipes such as are connected to rain spouts, for example, to walls of buildings by means of fastening devices including members for penetrating wooden portions of the wall or mortar between bricks thereof. It is generally difficult to determine the exact position which one of these fasteners must take to properly enter between bricks, for example, and it is consequently sometimes difficult to properly place a pipe to which the fastener has been secured or to secure a pipe to a fastener which has already been placed in the wall. Accordingly, various devices have been suggested which comprise two members, one arranged to be secured to the pipe and the other arranged to be secured in the wall, which are subsequently joined by a third member designed to be readily applied in the limited space usually existing between the pipe and wall.

It is the object of the present invention to provide a device of the latter character which is cheap in construction and which is readily placed in position to properly secure a pipe. The device is arranged so that relative adjustment may be made between the portion secured to the pipe and that secured to the wall to eliminate the effect of careless placing of the pipe and the necessity of a high degree of care.

Figure 1:
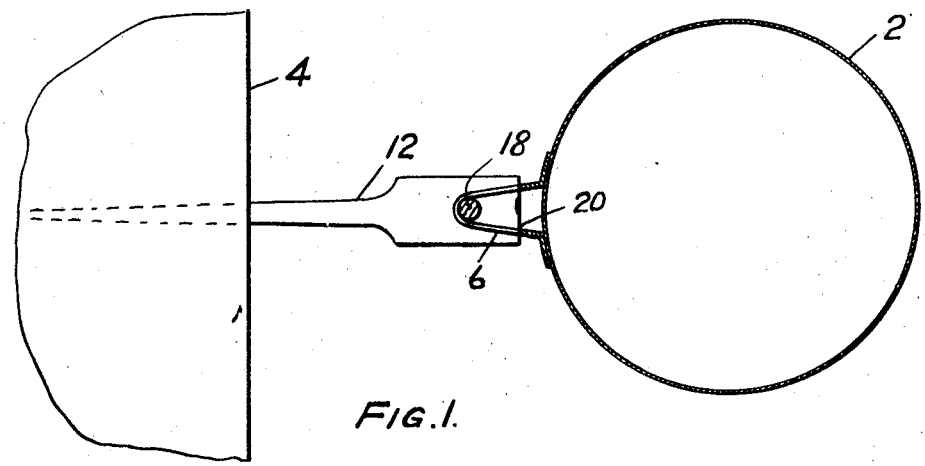
Fig. 1 is a horizontal sectional view showing the device connecting the pipe to a wall.
Figure 2:
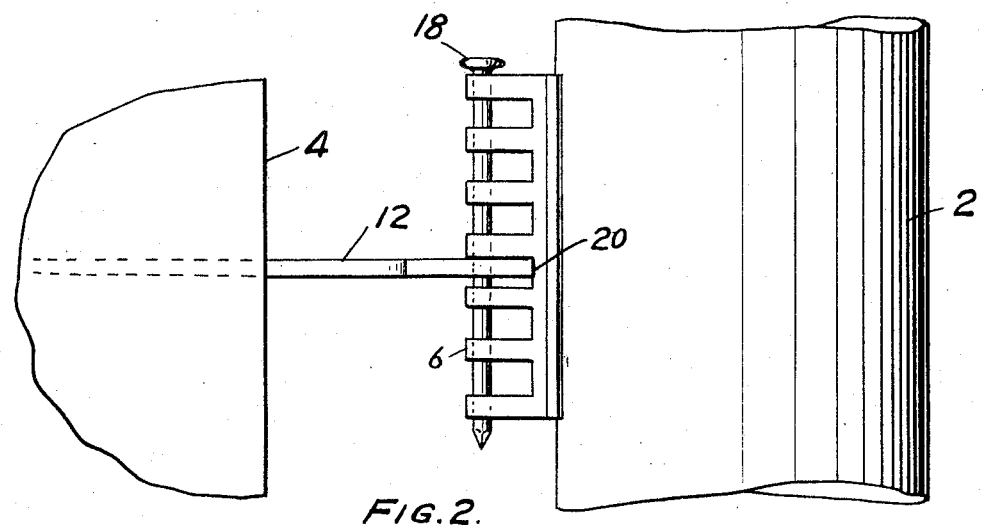
Fig. 2 is a vertical elevation of the same.
Figure 3:
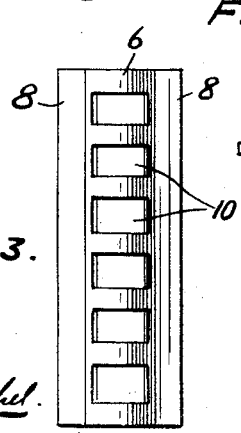
Fig. 3 is an elevation of the portion of the device adapted to be secured to the pipe.
Figure 4:
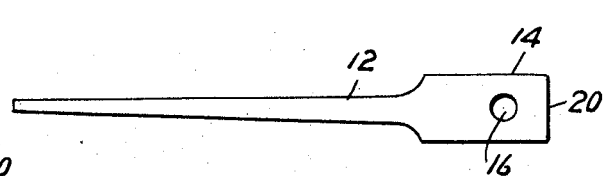
Fig. 4 is a plan view of the wall penetrating member.

At 2 there is illustrated a pipe which may be a water pipe connecting with a rain spout, for example, or a steam pipe connected with the interior of a building or the radiators in the interior of a building or the like. This pipe is arranged to extend, in the illustration shown, perpendicularly parallel to a wall. In order to secure the pipe against vibration and to properly position it fixedly with respect to the wall, the fastening device shown in the drawing is used.

This device comprises a U-shaped member 6, the free ends of the sides of which are bent to form flanges 8 which may be secured to pipe 2 by solder, rivets, or the like, or the entire device may be secured to a band extending about the pipe. U-shaped member 6 is slotted inwardly from the junction of the sides, as indicated at 10. These slots preferably extend to an equal distance inwardly along the sides of the member.

A wall penetrating member 12 which, in the form shown, is more particularly adapted to penetrate mortar between bricks of a wall, is provided with an enlarged flat head 14 perforated as shown at 16. It will be understood that the penetrating portion of member 12 may be so designed that it is particularly adapted for the use to which it is to be put. Instead of penetrating a wall, member 12 may be secured to the surface thereof, if properly formed, by means of screws, bolts, or the like.

In use, member 12 is secured to the wall with the flattened head 4 in a horizontal position if the pipe is vertical. Member 6 is secured to the pipe in any suitable manner as described and the pipe may then be brought into position beside member 12, as shown in the figures. Because of the plurality of slots in member 6, it is unnecessary to carefully align member 12 or the pipe, since by slight bending, for example, member 12 may be readily brought into alignment with one of the slots without the exercise of any particular degree of skill. The outer edge 20 of member 12 is brought into engagement with the inner ends of the slot 10 in which the head is positioned. When so arranged, perforation 16 through the head is aligned with the inner groove of the junction of the sides of U-shaped member 6. Pin 18 may then be dropped downwardly between the sides of member 6 and through perforation 16, thereby holding the parts fixedly in position, rotation of member 12 about the pin being prevented by the engagement of the inner edge 20 with the bottoms of the slot.

What I claim and desire to protect by Letters Patent is:

1. A pipe fastener comprising a U-shaped member of sheet metal the sides of which are arranged to be secured to a pipe, said member being slotted inwardly from the junction of the sides, a second member adapted to be secured to a wall or the like and arranged to engage within a slot, and a retaining pin adapted to extend between the sides of the U-shaped member and through the second member to retain the same within a slot.

2. A pipe fastener comprising a U-shaped member of sheet metal the sides of which are arranged to be secured to a pipe, said member being slotted inwardly from the junction of the sides, a second member adapted to be secured to a wall or the like and arranged to engage within a slot, and a retaining pin adapted to extend between the sides of the U-shaped member and through the second member to retain the same within a slot, said second member being retained against angular movement about the pin by engagement with the base of a slot.

In testimony of which invention, I have hereunto set my hand, at Philadelphia, Pennsylvania, on this 13th day of Sept., 1928.

HERBERT SHAW.